(12) United States Patent
Talhami et al.

(10) Patent No.: US 9,424,837 B2
(45) Date of Patent: Aug. 23, 2016

(54) VOICE AUTHENTICATION AND SPEECH RECOGNITION SYSTEM AND METHOD

(71) Applicant: AURAYA PTY LTD, Hornsby, New South Wales (AU)

(72) Inventors: Habib Emile Talhami, Hornsby (AU); Amit Sadanand Malegaonkar, Hornsby (AU); Renuka Amit Malegaonkar, Hornsby (AU); Clive David Summerfield, Hornsby (AU)

( * ) Notice: Subject to any disclaimer, the term of this patent is extended or adjusted under 35 U.S.C. 154(b) by 0 days.

(21) Appl. No.: 14/374,225

(22) PCT Filed: Jan. 23, 2013

(86) PCT No.: PCT/AU2013/000050
§ 371 (c)(1),
(2) Date: Jul. 23, 2014

(87) PCT Pub. No.: WO2013/110125
PCT Pub. Date: Aug. 1, 2013

(65) Prior Publication Data
US 2015/0019220 A1    Jan. 15, 2015

(30) Foreign Application Priority Data
Jan. 24, 2012    (AU) ................................. 2012900256

(51) Int. Cl.
*G10L 15/00* (2013.01)
*G10L 15/06* (2013.01)
*G10L 15/07* (2013.01)
*G10L 17/04* (2013.01)
*G10L 15/065* (2013.01)
*G10L 17/00* (2013.01)

(52) U.S. Cl.
CPC ............ *G10L 15/07* (2013.01); *G10L 15/063* (2013.01); *G10L 17/04* (2013.01); *G10L 15/065* (2013.01); *G10L 17/00* (2013.01); *G10L 2015/0635* (2013.01); *G10L 2015/0638* (2013.01)

(58) Field of Classification Search
None
See application file for complete search history.

(56) References Cited

U.S. PATENT DOCUMENTS

2012/0016678 A1    1/2012  Gruber et al.
2012/0323577 A1*  12/2012  Correia .................. G10L 15/22
                                                       704/254
(Continued)

FOREIGN PATENT DOCUMENTS

AU    2009290150 B2    3/2010
CN       1543641 A    11/2004
(Continued)

OTHER PUBLICATIONS

Gillmore, Adrian, International Search Report for WO/2013/110125, Mar. 14, 2013, 5 pages, ISA/AU, Australian Patent Office.
(Continued)

*Primary Examiner* — Marcus T Riley
(74) *Attorney, Agent, or Firm* — Henricks, Slavin & Holmes LLP (57) ABSTRACT

A method for configuring a speech recognition system comprises obtaining a speech sample utilized by a voice authentication system in a voice authentication process. The speech sample is processed to generate acoustic models for units of speech associated with the speech sample. The acoustic models are stored for subsequent use by the speech recognition system as part of a speech recognition process.

16 Claims, 6 Drawing Sheets

(56) References Cited

U.S. PATENT DOCUMENTS

2013/0332165 A1* 12/2013 Beckley .......... G10L 17/04
704/246
2014/0188481 A1* 7/2014 Kulkarni .......... G10L 17/00
704/273

FOREIGN PATENT DOCUMENTS

| CN | 1567431 | A | 1/2005 |
|----|---------|---|--------|
| CN | 102238189 | A | 11/2011 |
| CN | 102820033 | A | 12/2012 |
| WO | WO 01/16940 | | 3/2001 |
| WO | WO01/16940 | A1 | 3/2001 |
| WO | WO 2008/089508 | | 7/2008 |

OTHER PUBLICATIONS

Chen, HongHong, First Office Action, May 5, 2016, Application No. 201380016170.2, State Intellectual Property Office of China, Beijing China, 5 pages and 2 pages of partial translation.

* cited by examiner

VOICE AUTHENTICATION AND SPEECH RECOGNITION SYSTEM AND METHOD

CROSS REFERENCE TO RELATED APPLICATIONS

This application is a National Stage of International Application No. PCT/AU2013/000050, filed Jan. 23, 2013, which claims priority to Australia Provisional Patent Application No. 2012900256 filed Jan. 24, 2012, now lapsed.

FIELD OF THE INVENTION

This invention relates to the automatic tuning and configuration of a speech recognition system operating as part of a voice authentication system. The result is a system that both recognises the individual and recognises their speech.

BACKGROUND OF THE INVENTION

The key to making effective speech recognition systems is the creation of acoustic models, grammars and language models that enable the underlying speech recognition technology to reliably recognise what is being said and to make some sense of or understand the speech given the context of the speech sample within the application. The process of creating acoustic models, grammars and language models involves collecting a database of speech samples (also commonly referred to as voice samples) which represent the way speakers interact with speech recognition system. To create the acoustic models, grammars and language models each speech sample in the database needs to be segmented and labelled into their word or phoneme constituent parts. Then the entire common constituent parts for all speakers (such as all speakers saying the word "two", for example) are then compiled and processed to create the word (or phoneme) acoustic model for that constituent part. In large vocabulary phoneme based systems, the process also needs to be repeated to create the language and accent specific models and grammar for that linguistic market. Typically, around 1,000 to 2,000 examples of each word or phoneme (from each gender) are required to produce an acoustic model that can accurately recognise speech.

Developing speech recognition systems for any linguistic market is a data driven process. Without the speech data representative of the language and accent specific to that market the appropriate acoustic, grammar and language models cannot be produced. It follows that obtaining the necessary speech data (assuming it is available) and creating the appropriate language and accent specific models for a new linguistic market can be particularly time consuming and very costly.

It would be advantageous if there was provided a speech recognition system that could be automatically configured for any linguistic market in a cost effective manner.

SUMMARY OF THE INVENTION

In accordance with a first aspect of the present invention there is provided a method for configuring a speech recognition system, the method comprising:
 obtaining a speech sample utilised by a voice authentication system in a voice authentication process;
 processing the speech sample to generate acoustic models for units of speech associated with the speech sample; and
 storing the acoustic models for subsequent use by the speech recognition system as part of a speech recognition process.

In an embodiment the speech units comprise triphones, diphones, senones, phonemes, words or phrases.

In an embodiment the method further comprises evaluating speech content data associated with the speech sample to determine an audible identifier for each of the speech units and classifying the acoustic models based on the determined audible identifier.

In an embodiment the method further comprises updating the stored acoustic models based on acoustic models generated from further obtained and processed speech samples.

In an embodiment the method further comprises determining a quality for each of the stored acoustic models and continuing to update the acoustic models until the quality reaches a predefined threshold.

In an embodiment the speech samples are provided by different users of the authentication system during enrolment therewith.

In an embodiment the method further comprises storing the acoustic models in a generalised speech recognition database.

In an embodiment the method further comprises obtaining only speech samples that are associated with one or more predefined speech profiles selected from the group comprising: language, gender, channel medium, grammar.

In an embodiment the speech samples are provided by the same user either during enrolment with the authentication system or as part of a subsequent authentication session.

In an embodiment the acoustic models are stored in a database particular to the user and wherein the database is automatically accessed for performing the speech recognition process responsive to the user authenticating themselves with the authentication system.

In accordance with a second aspect of the present invention there is provided a combined speech recognition and voice authentication method, comprising utilising an output of a voice authentication determination for a user to set a parameter of a speech recognition function for subsequently recognising an utterance by the user.

In an embodiment the output is utilised to select one of a plurality of acoustic model databases for use by the speech recognition function in recognising the user's utterance, each acoustic model database containing a set of differently trained acoustic models.

In an embodiment the database comprises acoustic models of speech units which have been trained using voice data derived from utterances provided by the user either during enrolment with the authentication system or during a subsequent authentication session.

In an embodiment the database comprises acoustic models of speech units which have been trained utilising speech samples provided by one or more other users having a shared voice profile to the user.

In accordance with a third aspect of the present invention there is provided a computer readable medium implementing a computer program comprising one or more instructions for controlling a computer system to implement a method as described in accordance with the first aspect above.

In accordance with a fourth aspect of the present invention there is provided a speech recognition system comprising:
 a processing module operable to obtain a speech sample utilised by a voice authentication system in a voice authentication process, the processing module further arranged to process the speech sample to generate acoustic models of speech units associated with the speech sample; and a storage module operable to store the acoustic models for subsequent use by the speech recognition system as part of a speech recognition process implemented by the processing module.

In an embodiment the speech units comprise triphones, diphones, senones, phonemes, words or phrases.

In an embodiment the processing module is further operable to evaluate speech content data associated with the speech sample to determine an audible identifier for each of the speech units and classify the acoustic models based on the relevant identifier.

In an embodiment the processing module is further arranged to update the stored acoustic models based on acoustic models generated from further obtained and processed speech samples.

In an embodiment the processing module is further operable to determine a quality for each of the stored acoustic models and continuing to update the acoustic models until the quality reaches a predefined threshold.

In an embodiment the speech samples are provided by different users of the authentication system during enrolment therewith.

In an embodiment the acoustic models are stored in a generalised speech recognition database.

In an embodiment the processing module is further operable to obtain only speech samples that are associated with one or more desired predefined profiles selected from the group comprising: language, gender, channel medium, grammar.

In an embodiment the speech samples are provided by the same user either during enrolment with the authentication system or as part of a subsequent authentication session.

In an embodiment the system comprises a database being operable to store the acoustic models and wherein the database is automatically accessed for performing the speech recognition process responsive to the user being successfully authenticated by the authentication system.

In accordance with a fifth aspect of the present invention there is provided a combined speech recognition and voice authentication system, the system comprising:

a voice authentication function operable to authenticate a user utterance;

a speech recognition function operable to evaluate subsequent utterances by the user responsive to a positive authentication being made by the voice authentication function; and a parameter setting module operable set a parameter of the speech recognition function based on a user identifier as established by the voice authentication function.

In an embodiment the identifier is utilised to select one of a set of acoustic model databases used by the speech recognition function in recognising the user's subsequent utterances.

In an embodiment the selected database comprises acoustic models which have been trained using speech samples provided by the user either during enrolment with the authentication system or during a subsequent authentication determination.

In an embodiment the selected database comprises acoustic models which have been trained using speech samples provided by one or more other users who have a shared voice profile to the user, the voice profile being determined from the voice authentication determination.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION OF PREFERRED EMBODIMENTS

Embodiments utilise speech samples processed by a voice authentication system (also commonly referred to as voice biometric system) for automatically creating speech recognition models that can advantageously be utilised for providing added speech recognition capability. Since the generated models are based on samples provided by actual users of the system, the system is tuned to the users and is thus able to provide a high level of speech recognition accuracy for that population of users. This technique also obviates the need to purchase "add on" speech recognition solutions which are not only costly but can also be difficult to obtain, particularly for markets where speech databases suitable for creating the acoustic models, grammars and language models used by speech recognition technology are not available. Embodiments also relate to creating personalised speech recognition models for providing an even greater level of speech recognition accuracy for individual users of the system.

For the purposes of illustration, and with reference to the figures, embodiments of the invention will hereafter be described in the context of a voice processing system 102 which provides both voice authentication and speech recognition functions for a secure service 104, such as an interactive voice response ("IVR") telephone banking service. In the illustrated embodiment, the voice processing system 102 is implemented independently of the secure service 104 (e.g. by a third party provider). In this embodiment, users of the secure service 104 communicate with the secure service 104 using an input device in the form of a telephone 106 (e.g. a standard telephone, mobile telephone or Internet Protocol (IP) based telephone service such as Skype™).

Figure 1:
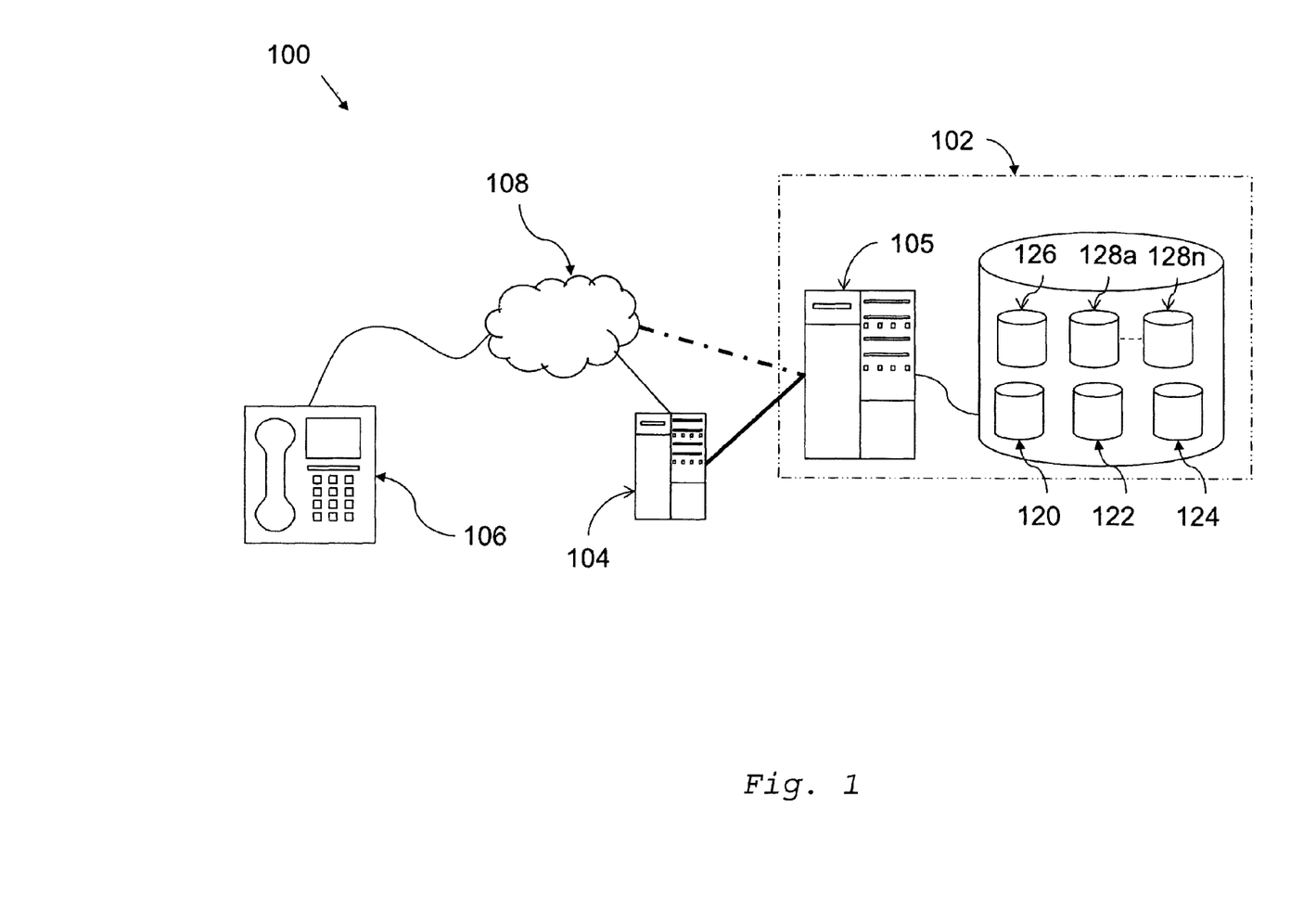
FIG. 1 is a block diagram of a system in accordance with an embodiment of the present invention.

FIG. 1 illustrates an example system configuration 100 for implementing an embodiment of the present invention. As discussed above, users communicate with the telephone banking service 104 using a telephone 106. The secure service 104 is in turn connected to the voice processing system 102 for initially authenticating the users and thereafter to provide speech recognition capability for user voice commands during a telephone banking session. According to the illustrated embodiment, the voice processing system 102 is connected to the secure service 104 over a communications network in the form of a public-switched telephone network 108.

Further Detail of System Configuration

Figure 2:
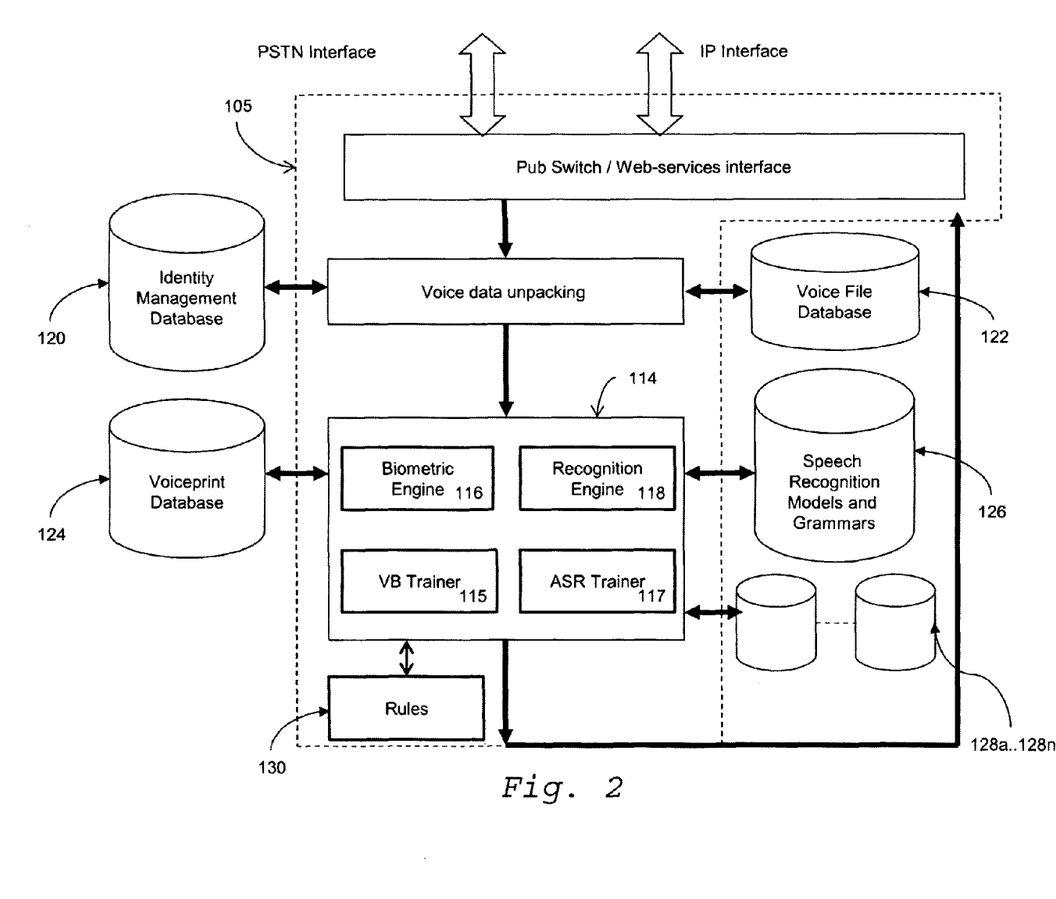
FIG. 2 is a schematic of the individual modules implemented by the voice processing system of FIG. 1.

With reference to FIG. 2, the voice processing system 102 comprises a server computer 105 which includes typical server hardware including a processor, motherboard, random access memory, hard disk and a power supply. The server 105 also includes an operating system which co-operates with the hardware to provide an environment in which software applications can be executed. In this regard, the hard disk of the server 105 is loaded with a processing module 114 which, under the control of the processor, is operable to implement various voice authentication and speech recognition functions. As illustrated, the processing module 114 is made of up various individual modules/components for carrying out the afore-described functions, namely a voice biometric trainer 115, voice biometric engine 116, automatic speech recognition trainer 117 and automatic speech recognition engine 118.

The processing module 114 is communicatively coupled to a number of databases including an identity management database 120, voice file database 122, voiceprint database 124 and speech recognition model and grammar database 126. A number of personalised speech recognition model databases 128a to 128n may also be provided for storing models and grammar that are each tailored to a particular user's voice. A rule store 130 is provided for storing various rules implemented by the processing module 114, as will be described in more detail in subsequent paragraphs.

The server 105 includes appropriate software and hardware for communicating with the secure service provider system 104. The communication may be made over any suitable communications link, such as an Internet connection, a wireless data connection or public network connection. In an embodiment, user voice data (i.e. data representative of speech samples provided by users during enrolment, authentication and subsequent interaction with the secure service provider system 104) is routed through the secure service provider 104. Alternatively, the voice data may be provided directly to the server 105 (in which case the server 105 would also implement a suitable call answering service).

As discussed, the communication system 108 of the illustrated embodiment is in the form of a public switched telephone network. However, in alternative embodiments the communications network may be a data network, such as the Internet. In such an embodiment users may use a networked computing device to exchange data (in an embodiment, XML code and packetised voice messages) with the server 105 using a network protocol, such as the TCP/IP protocol. Further details of such an embodiment are outlined in the international patent application PCT/AU2008/000070, the contents of which are incorporated herein by reference. In another alternative embodiment, the communication system may additionally comprise a third or fourth generation ("3G"), CDMA or GPRS-enabled mobile telephone network connected to the packet-switched network, which can be utilised to access the server 105. In such an embodiment, the user input device 102 includes wireless capabilities for transmitting the speech samples as data. The wireless computing devices may include, for example, mobile phones, personal computers having wireless cards and any other mobile communication device which facilitates voice recordal functionality. In another embodiment, the present invention may employ an 802.11 based wireless network or some other personal virtual network.

According to the illustrated embodiment the secure service provider system 104 is in the form of a telephone banking server. The secure service provider system 104 comprises a transceiver including a network card for communicating with the processing system 102. The server also includes appropriate hardware and/or software for providing an answering service. In the illustrated embodiment, the secure service provider 104 communicates with the users over a public-switched telephone network 108 utilising the transceiver module.

Voiceprint Enrolment

Figure 3:
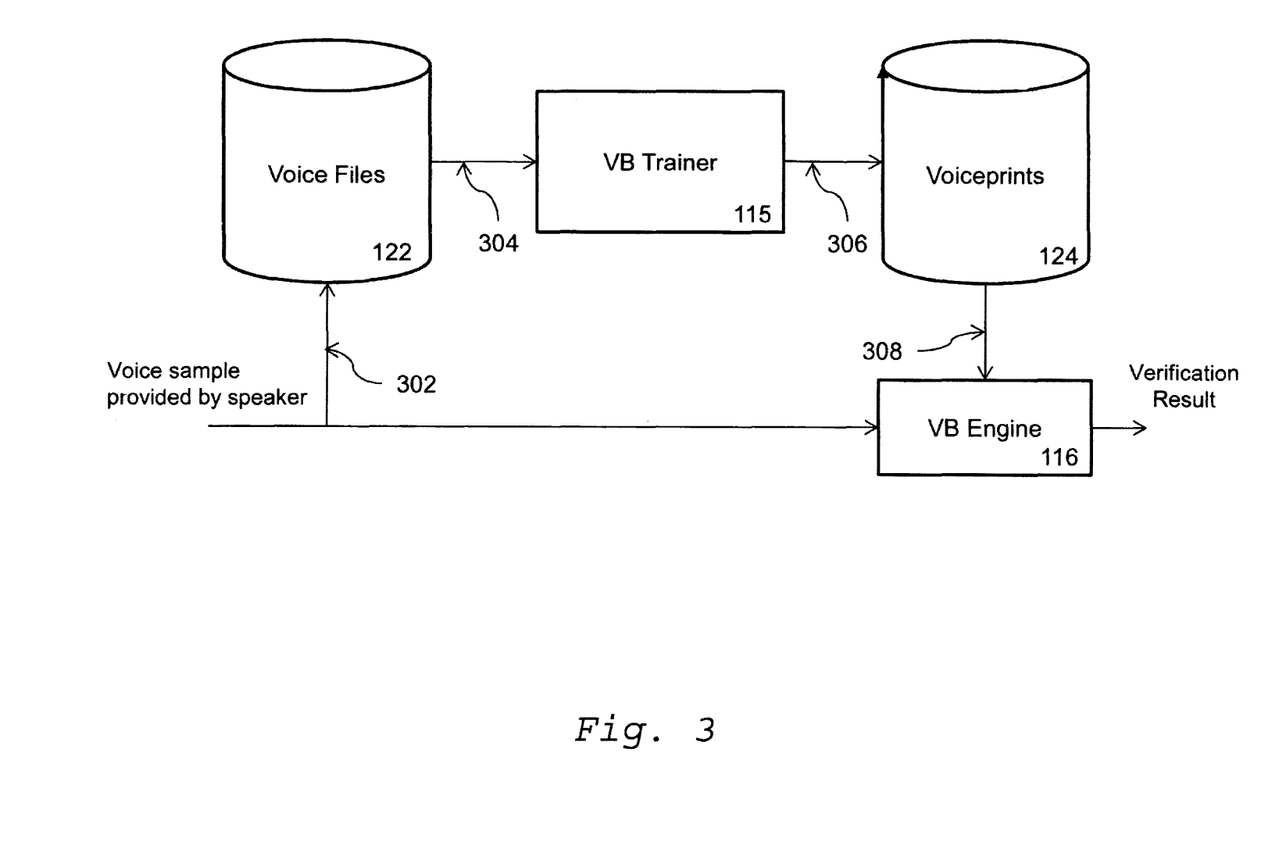
FIG. 3 is a schematic illustrating a process flow for creating voiceprints.

Before describing techniques for creating speech recognition models in any detail, a basic process flow for enrolling speech samples and generating voiceprints will first be described with reference to FIG. 3. At step 302 a speech sample is received by the voice processing system 102 and stored in the voice file database 122 in a suitable file storage format (e.g. a wav file format). The voice biometric trainer 115 processes the stored voice file at step 304 for generating a voiceprint which is associated with an identifier for the user who provided the speech sample. The system 102 may request additional speech samples from the user until a sufficient number of samples have been received for creating an accurate voiceprint. Typically, for a text-dependent implementation (i.e. where the text spoken by the user must be the same for enrolment and verification) three repeats of the same words or phrases are requested and processed so as to generate an accurate voiceprint. In the case of a text-independent implementation (i.e. where any utterance can be provided by the user for verification purposes), upwards of 30 seconds of speech is requested for generating an accurate voiceprint.

Voiceprint quality may, for example, be measured using the process described in the granted Australian patent 2009290150 to the same applicant, the contents of which are incorporated herein by reference. At step 306 the voiceprint is loaded into the voiceprint database 124 for subsequent use by the voice biometric engine 116 during a user authentication process (step 308). The verification samples provided by the user during the authentication process (which may, for example, be a passphrase, account number, etc.) are also stored in the voice file database 122 for use in updating or "tuning" the stored voiceprint associated with that user, using techniques well understood by persons skilled in the art.

Creating Generalised Speech Recognition Models

Figure 4:
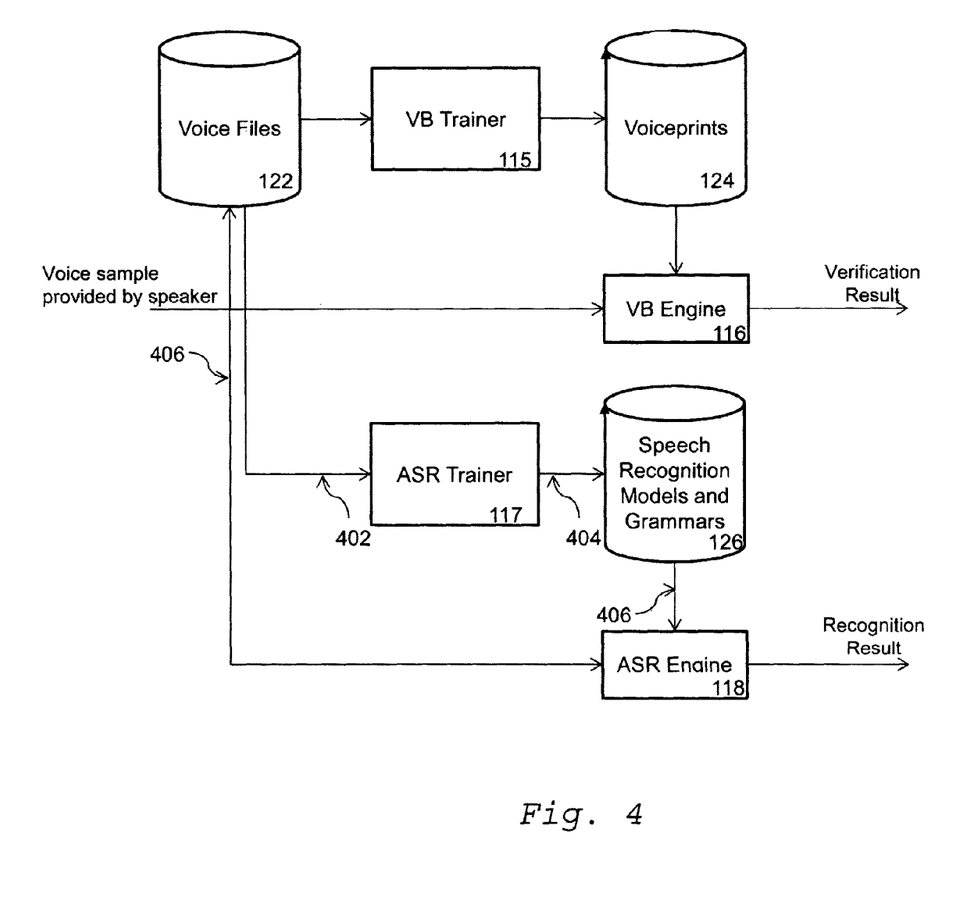
FIG. 4 is a schematic illustrating a process flow for providing speech recognition capability for the FIG. 1 system, in accordance with an embodiment of the invention.

With reference to FIG. 4, there is shown an extension of the enrolment process which advantageously allows for automatic creation of generalised speech recognition models for speech recognition capability, based on the enrolled voice files. At step 402 a stored voice file (which may either be a voice file provided during enrolment, or a voice file provided post successful authentication) is passed to the ASR trainer 117 which processes the voice file to generate acoustic models of speech units associated with the voice file, as will be described in more detail in subsequent paragraphs. The acoustic models, which are each preferably generated from multiple voice files obtained from the voice file database 122, are subsequently stored in the speech recognition model database 126 at step 404. The models may subsequently by used at step 406 to provide automatic speech recognition capability for users accessing the secure service 104.

Figure 5:
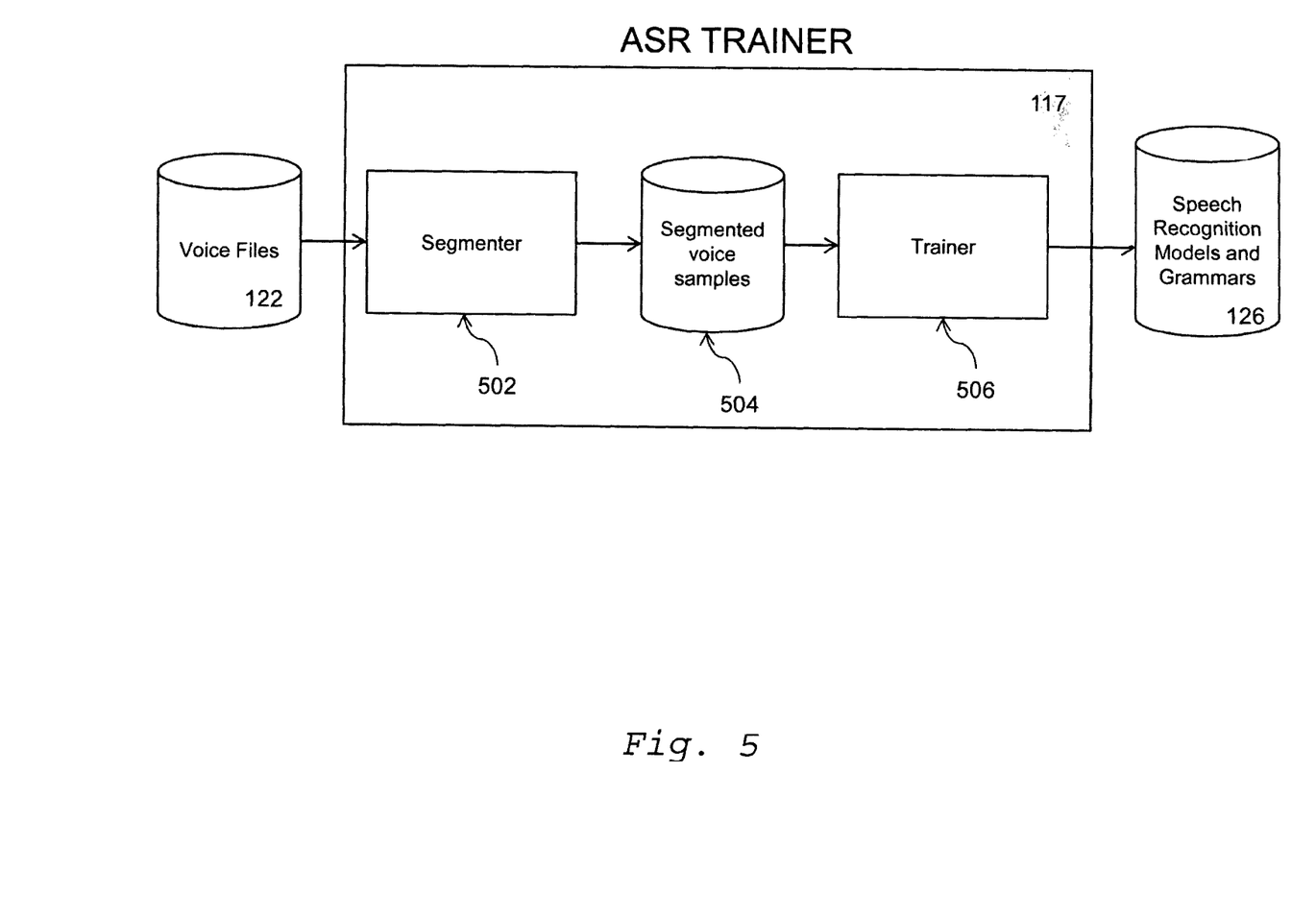
FIG. 5 is a schematic illustrating a process flow for building speech recognition models and grammar, in accordance with an embodiment.

In more detail, and with additional reference to FIG. 5, the acoustic model generating step 402 comprises breaking the voice files up into speech units (also referred to as components) of the desired type of speech unit using a segmenter module (502). According to the illustrated embodiment, the different types of speech unit processable by the segmenter module 502 include triphones, diphones, senomes, phonemes, words and phrases, although it will be understood that any suitable unit of speech could be processable depending on the desired implementation. The segmenter module 502 assigns a start point for the speech unit and a finish point for the speech unit. The segmenter module 502 may be programmed to identify the finish point as the start point for the following speech unit. Equally, the segmenter module 502 may be programmed to recognise a gap between the finish of one speech unit and the start of the following speech unit. The waveform in the gap is herein referred to as "garbage" and may represent silence, background noise, noise introduced by the communications channel or a sound produced by the speaker but not associated with speech, such as breath noises, "ums", "ars", hesitations and the like. Such sounds are used by the trainer 506 to produce a special model that is commonly referred to in the art as a "garbage model" or "garbage models". The garbage models are subsequently used by the recognition engine 126 to recognise sounds heard in the speech samples but which are not a predefined speech unit. The segmented non-garbage speech units are stored at step 504 in association with an audible identifier (hereafter "classifier") which is derived from speech content data associated with the original speech sample. For example, the voice processing system may store metadata that contains the words or phrases spoken by a user during enrolment (e.g. their account number, etc.). A phonetic look-up dictionary may be evaluated by the segmenter 502 to determine the speech units (triphones, diphones, senones or phonemes) that make up the enrolled word/phrase. Generalised or prototype acoustic models of the speech units are stored in the segmenter 502 and used thereby to segment the speech provided by the user into its constituent triphones, diphones, senones or phonemes parts. Further voice files are obtained, segmented and stored (step 504) until a sufficient number of samples of each speech unit have been obtained to create a generalised speech model for the classified speech unit. In a particular embodiment, between 500 and 2,000 samples of each triphone, diphone, senone or phoneme part is required to produce a generalised acoustic model for that part suitable for recognition. According to the illustrated embodiment, as new voice files are stored in the database 122 they are automatically processed by the ASR trainer 117 for creating and/or updating acoustic models stored in the model database 126. Typically between 500 and 2,000 voice files are obtained and processed before a model is generated in order to provide a model which will sufficiently reflect the language and accent of the enrolled users. The speech units are subsequently processed by a trainer module 506. The trainer module 506 processes the segmented speech units spoken by the enrolled speakers to create the acoustic models for each of the speech units required by the speech recognition system, using model generation techniques known in the art. Similarly, the training module 506 also compiles the grammars and language models from the voice files associated with the speech units being used by the speech recognition. The grammars and language models are computed from a statistical analysis of the sequences of triphones, diphones, senones, phonemes, word and/or phrases in the speech samples, that is denoting the probability of a specific triphone, diphone, senone, phonemes, word and/or phrase being followed by another specific triphone, diphone, senone, phoneme, word and/or phrase. This way the acoustic models, grammars and language models are implemented specific to the way the speakers enrolled in the system and therefore specific to the accent and language spoken by the enrolled speakers. The generated models and embedded grammar are stored in the database 126 for subsequent use in providing automatic speech recognition to users of the secure service 104.

In an embodiment, certain rules are implemented by the processing module 114 which specify the minimum number of speech unit samples that must be processed for model creation. The rules may also specify a quality for a stored model before it will be utilisable by the processing module 114 for recognising speech. In a particular embodiment, for each classifier there may exist a male and female gender model. According to such an embodiment, the rules may provide that only speech samples from male users are selected for creating the male models and female users for creating the female models. This may be determined from metadata stored in associated with the known user, or by way of an evaluation of the sample (which involves acoustically processing the sample employing both female and male models and determining the gender based on the resultant authentication score i.e. a higher score with a male model denotes a male speaker, while a higher score using the female model denotes a female speaker). Additional or alternative models may equally be created for different language, channel medium (e.g. mobile phone, landline, etc.) and grammar profiles, such that a particular model set will be selected based on a detected profile for a caller. The detected profile may, for example, be determined based on data available with the call (such as telephone line number or IP address which would indicate which profile most closely matches the current call), or by processing the speech using a number of different models in parallel and selecting the model that generates the best result or fit (e.g. by evaluating the resultant authentication score).

Creating Personalised Speech Recognition Models

Once a user has been successfully authenticated they are considered 'known' to the system 102. In a particular embodiment, once a user is known a personalised set of models can be created and subsequently accessed for providing greater speech recognition accuracy for that user.

Figure 6:
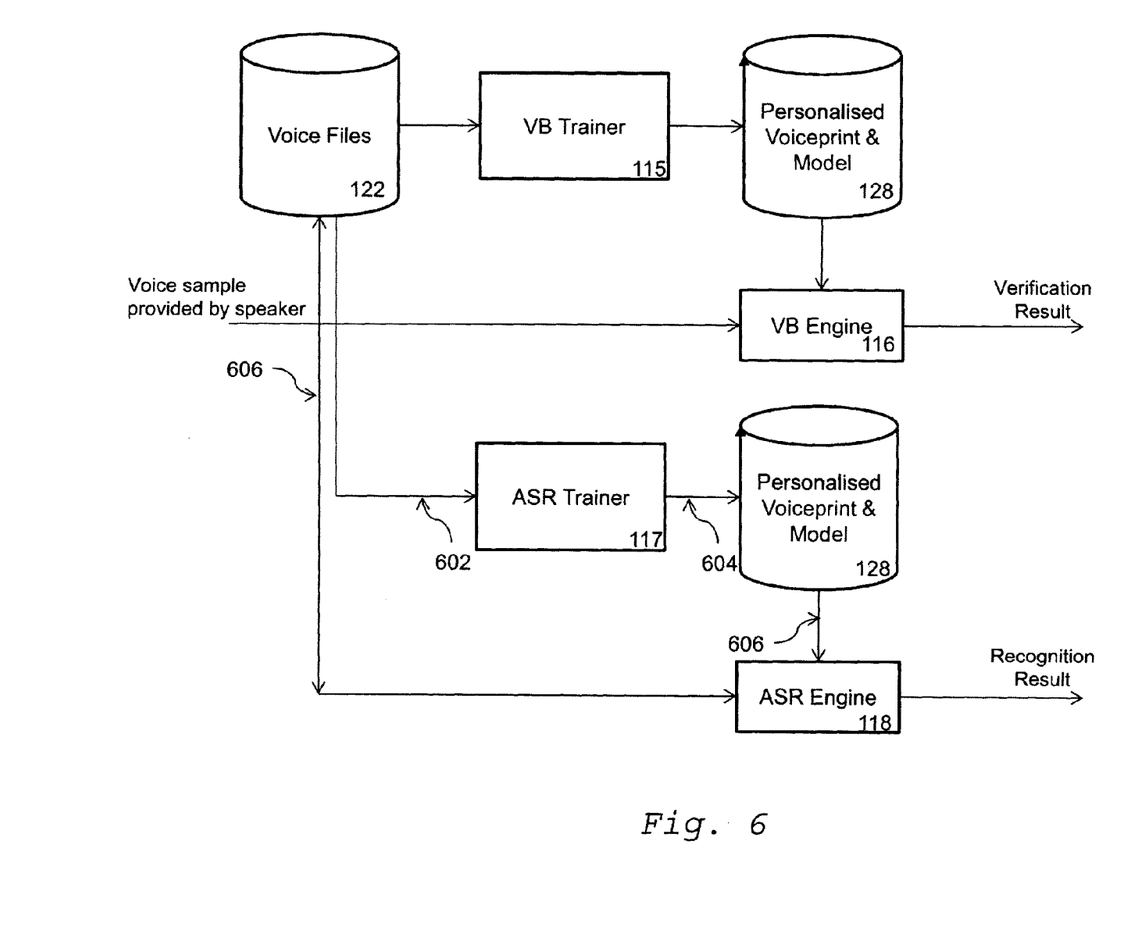
FIG. 6 is a schematic illustrating a process flow for providing user specific speech recognition capability for the FIG. 1 system, in accordance with an embodiment.

According to such an embodiment, and with additional reference to FIG. 6, a personalised voiceprint and speech recognition database 128 is provided for each user known to the system (see steps 602 to 606). The models may be initially configured from speech samples provided by the user during enrolment (e.g. in some instances the user may be asked to provide multiple enrolment speech samples for example stating their account number, name, pin number, etc. which can be processed for creating a limited number of models), from generic models as previously described, or from a combination of the two. As new speech samples are provided by the user new models can be created and existing models updated, if required. It will be appreciated that the new samples may be provided either during or after successful authentication of the user (e.g. resulting from voice commands issued by the user during the telephone banking session). The user may also be prompted by the system 102 to utter particular words, phrases or the like from time to time (i.e. at step 602) to assist in building a more complete set of models for that user. Again, this process may be controlled by rules stored in the rule store 130.

Although embodiments described in preceding paragraphs described the processing system 102 in the form of a "third party", or centralised system, it will be understood that the system 102 may instead be integrated into the secure service provider system 104.

Alternative configuration and methodology may include the collection of speech samples by speakers using third party speech recognition function such as the "Siri" personal assistant (as described in the published United States patent application no. 20120016678 assigned to Apple Inc.), or "Dragon" speech recognition software (available from Nuance Communications, Inc. of Burlington, Mass.) integrated into a smart phone or other computing device which is used in conjunction with a voice authentication system as described herein. In this case the speech samples from the "known" speaker can be stored in the voice files database 122 and then used by the segmenter module 502 and trainer module 506 to create speech recognition models for that speaker using the process described above.

Alternatively, speech samples collected by a host or cloud service, such as a hosted IVR service or a cloud based voice processing system, used in conjunction with a voice authentication system, could also be used to create the speech recognition models using the methodology described herein.

While the invention has been described with reference to the present embodiment, it will be understood by those skilled in the art that alterations, changes and improvements may be made and equivalents may be substituted for the elements thereof and steps thereof without departing from the scope of the invention. In addition, many modifications may be made to adapt the invention to a particular situation or material to the teachings of the invention without departing from the central scope thereof. Such alterations, changes, modifications and improvements, though not expressly described above, are nevertheless intended and implied to be within the scope and spirit of the invention. Therefore, it is intended that the invention not be limited to the particular embodiment described herein and will include all embodiments falling within the scope of the independent claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The claims defining the invention are as follows:

1. A method for configuring a speech recognition system, the method comprising:
   obtaining a speech sample from a user utilised to authenticate the user as part of an authentication process;
   processing the speech sample to train one or more generic acoustic model(s) for units of speech associated with the speech sample;
   storing the trained acoustic model(s) in a personalised acoustic model set for the user;
   selectively re-training the acoustic model(s) in the personalised model set based on additional speech samples provided by the user containing corresponding units of speech;
   responsive to determining that the user has accessed a speech recognition function, directing a speech recognition process to access the personalised model set for recognising subsequent user utterances; and
   further comprising determining a measure of quality for each of the stored acoustic models and wherein the acoustic modules are re-trained based on additional speech samples until the corresponding quality measure meets a predefined threshold.

2. A method in accordance with claim 1, wherein the speech units comprise triphones, diphones, senones, phonemes, words or phrases.

3. A method in accordance with claim 2, further comprising evaluating speech content data associated with the speech sample to determine an audible identifier for each of the speech units and classifying the acoustic models based on the determined audible identifier.

4. A method in accordance with claim 1, wherein the acoustic models comprise language models for the units of speech.

5. A method in accordance with claim 1, wherein the speech recognition process is automatically directed to access the personalised model set responsive to the user being successfully authenticated.

6. A combined speech recognition and voice authentication method, comprising:
   responsive to a user being successfully authenticated by a voice authentication function, accessing a personalised set of acoustic language models for use by a speech recognition function in recognising one or more utterances by the user, the acoustic model set containing acoustic language models which have been trained using voice data derived from utterances provided by the user either during enrolment with the authentication function or during one or more subsequent authentications.

7. A method in accordance with claim 6, wherein the personalised model set comprises acoustic models of speech units which have been trained utilising speech samples provided by one or more other users having a shared voice profile to the user.

8. A non-transitory computer readable medium implementing a computer program comprising one or more instructions for controlling a computer system to implement a method in accordance with claim 1.

9. A speech recognition system comprising:
   a processing module programmed to:
   obtain a speech sample utilised to authenticate a user as part of an authentication process;
   process the speech sample to train one or more generic acoustic models for speech units associated with the speech sample and to subsequently store the trained acoustic model(s) in a personalised acoustic model set;
   selectively re-train the acoustic model(s) based on additional speech samples provided by the user containing corresponding units of speech;
   responsive to determining that the user has accessed a speech recognition function, the processing module is further arranged to access the personalised acoustic model set for recognising subsequent user utterances; and
   the processing module being further programmed to determine a measure of quality for each of the stored acoustic models and continuing to regenerate the acoustic models until the quality measure reaches a predefined threshold.

10. A system in accordance with claim 9, wherein the speech units comprise triphones, diphones, senones, phonemes, words or phrases.

11. A system in accordance with claim 9, wherein the processing module is further operable to evaluate speech content data associated with the speech sample to determine an audible identifier for each of the speech units and classify the acoustic models based on the relevant identifier.

12. A system in accordance with claim 9, wherein the additional speech samples are provided by the user either during enrolment with the authentication system or as part of a subsequent authentication session.

13. A system in accordance with claim 9, wherein the personalised acoustic model set is automatically accessed for performing the speech recognition process responsive to the user being successfully authenticated by the authentication system.

14. A method in accordance with claim 1, wherein the acoustic models comprise grammar models for the units of speech.

15. A combined speech recognition and voice authentication method, comprising:

responsive to a user being successfully authenticated by a voice authentication function, accessing a personalised set of acoustic grammar models for use by a speech recognition function in recognising one or more utterances by the user, the acoustic model set containing acoustic grammar models which have been trained using voice data derived from utterances provided by the user either during enrolment with the authentication function or during one or more subsequent authentications; and further comprising determining a measure of quality for each of the stored acoustic models and wherein the acoustic modules are re-trained based on additional speech samples until the corresponding quality measure meets a predefined threshold.

16. A method in accordance with claim 15, wherein the personalised model set comprises acoustic models of speech units which have been trained utilising speech samples provided by one or more other users having a shared voice profile to the user.

* * * * *